(12) United States Patent
Enzinna et al.

(10) Patent No.: US 7,051,761 B2
(45) Date of Patent: May 30, 2006

(54) FILL AND BLEED VALVE FOR LIQUID COOLING SYSTEM

(75) Inventors: Donald John Enzinna, Lockport, NY (US); Ilya Reyzin, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 175 days.

(21) Appl. No.: 10/860,200

(22) Filed: Jun. 3, 2004

(65) Prior Publication Data

US 2005/0268974 A1    Dec. 8, 2005

(51) Int. Cl.
*F16K 11/07* (2006.01)
(52) U.S. Cl. .................... 137/625.48; 62/292
(58) Field of Classification Search .......... 137/625.48, 137/625.43, 625.5; 62/292
See application file for complete search history.

(56) References Cited

U.S. PATENT DOCUMENTS

| 610,134 | A | * | 8/1898 | Green | 122/421 |
|---|---|---|---|---|---|
| 2,703,106 | A | * | 3/1955 | Borgerd et al. | 137/625.29 |
| 3,388,720 | A | * | 6/1968 | Parr | 137/625.48 |
| 3,937,253 | A | * | 2/1976 | Lilja | 137/625.18 |
| 4,234,015 | A | * | 11/1980 | Kintner | 137/625.18 |
| 4,319,607 | A | * | 3/1982 | Fields | 137/625.5 |
| 4,466,457 | A | * | 8/1984 | Brane et al. | 137/599.12 |
| 6,041,819 | A | * | 3/2000 | Walleman | 137/625.5 |

* cited by examiner

*Primary Examiner*—John Fox
(74) *Attorney, Agent, or Firm*—Patrick M. Griffin

(57) ABSTRACT

A fill and bleed valve for filling a liquid cooling system has a single axially movable plunger, slidable within a central block bore, from a normal operating position to a filling position that opens the cooling system to a supply of coolant. The filling operation is continued until all air is purged from the system. The central block bore also retains a solid fill of coolant, and when shifted back to the normal operating system, no air is introduced into the system.

5 Claims, 3 Drawing Sheets

FILL AND BLEED VALVE FOR LIQUID COOLING SYSTEM

TECHNICAL FIELD

This invention relates to liquid cooling systems in general, and, in particular, to a fill and bleed valve for such a system used in a liquid cooling system for electronic components.

BACKGROUND OF THE INVENTION

Electronic components, in particular higher powered computer chips, are becoming more powerful and, consequently, need greater cooling capacity to run properly and durably. Air cooling systems are inherently limited in cooling capacity, and liquid systems, made up of a liquid heat exchanger in close proximity to the component, a pump, and an air to liquid heat exchanger exchanging heat with the ambient, are finding increasing use. Such systems need to be filled, at the time of manufacture, with liquid coolant, meaning that all of the components and lines need to be fully filled and bled of air. Typically, an in line coolant reservoir would be used both to provide a continual supply of make up coolant and to allow air in the system to be continually bled off, much like the reservoirs used in conventional vehicle engine cooling systems. It would be preferable to fill and seal the system air free on a one time basis, with a more compact fill valve, rather than provide a bulky and expensive reservoir.

A known fill and bleed valve for a computer chip liquid cooling system uses a set of three rotary valves, one central valve that interrupts the main cooling line, and two rotary fill valves, one to either side of the main shut off valve, that open up a fill inlet and fill outlet port into the system to allow an initial coolant fill to be pumped into, through, and finally out of the system components and lines. Clear lines in the vicinity of the rotary valves provide a visual indication of enough liquid having been pumped in and through the system to displace all entrapped air. That done, the two rotary fill valves can be shut off, and the intermediate main valve re opened. Three separate valves and rotary actions are themselves somewhat bulky and expensive. Furthermore, depending on the level, relative to the fill inlet and outlet points, of the length of system line located between the inlet and outlet points, some air may be trapped and not be totally purged by the fill.

SUMMARY OF THE INVENTION

The invention provides an improved fill and bleed valve that is simpler, more compact, and which does not potentially trap air that can't be purged by the fill event.

In the preferred embodiment disclosed, a compact valve body interrupts the main system line at a convenient fill point. A central valve body bore, with a closed inner end and an open outer end, opens to a system inlet port and a system outlet port at slightly axially offset points. A pair of axially spaced fill ports also open into the central bore, specifically a fill inlet port located between the system inlet port and the open end of the central bore, and a fill outlet port located between the system outlet port and the closed end of the central bore. A plunger axially movable within the bore, and accessible from the open end of the bore, carries two axially spaced sealing disks.

When the plunger is shifted outward to a fill position, the inner disk moves between and divides the two system ports from one another. Concurrently, the outer disk and inner disk together serve to open the fill inlet port and system inlet port to one another. At the same time, the inner disk moves to capture the system and fill outlet ports between it and the closed bottom of the bore, while the outer disk moves to capture the system and fill inlet ports between it and the inner disk. In the valve's fill position, liquid coolant may be pumped from a supply pool into the system inlet port, flowing into the system inlet port, and then continually through all components and lines of the liquid cooling system, and finally into the system outlet port, out the fill outlet port, and back into the coolant supply pool. This continues until air appears to be purged from the system. Liquid also solidly fills the central bore.

When the fill appears to be air free, the plunger is shifted inwardly to a closed or system operating position. Now, the two system ports are re opened to one another, and the two fill ports and divided off from the two system ports, concurrently. The small volume of liquid filling the central valve body bore, from the fill operation, is either squeezed back out into the supply pool or remains in place, without air intrusion. The valve operation requires only the axial push and pull of the plunger, and only the two sealing disks represent potential leak points from the system and out of fill ports. If desired, the fill ports can be easily separately plugged, post fill, if desired.

DESCRIPTION OF THE PREFERRED EMBODIMENT

Figure 4:
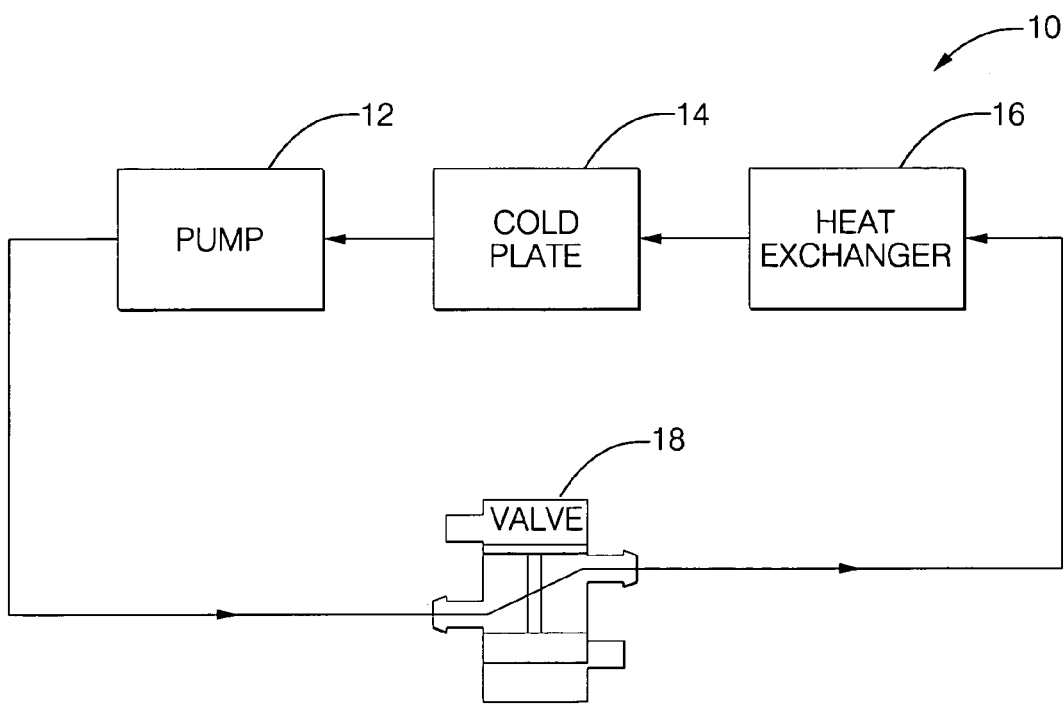
FIG. 4 is a schematic of a liquid cooling system, with a fill and bleed valve according to the invention, during ordinary operation.

Referring first to FIG. 4, a liquid cooling system, indicated generally at 10, has several coolant line interconnected components, including a pump 12, so called cold plate 14, and air to liquid heat exchanger 16, all of which have liquid coolant (typically a water/glycol mixture) circulating therethrough on a continual basis. The cold plate 14 would be mounted to a computer chip or other heat producing component, which is continually cooled by the system 10. All components, and the interconnecting lines, need to be filled at the time of assembly, and the coolant fill, ideally, should be solid and air free, so as to avoid pump cavitation and provide maximum efficiency. It is unlikely that significant coolant would be lost, in a well sealed system, but reservoirs have been provided in such systems, in order to provide a means for air bleed from the system. In the subject invention, instead of a reservoir, a fill and bleed valve, indicated generally at 18, is used to allow for the initial coolant fill, and provides the fill on air free basis, so that a reservoir is unnecessary. The valve 18 is left as a permanent part of the system 10 and could, theoretically, be used again for a system coolant refill, should that become necessary. Ideally, however, the valve would be used on a one time basis, after which it would become redundant.

Figure 1:
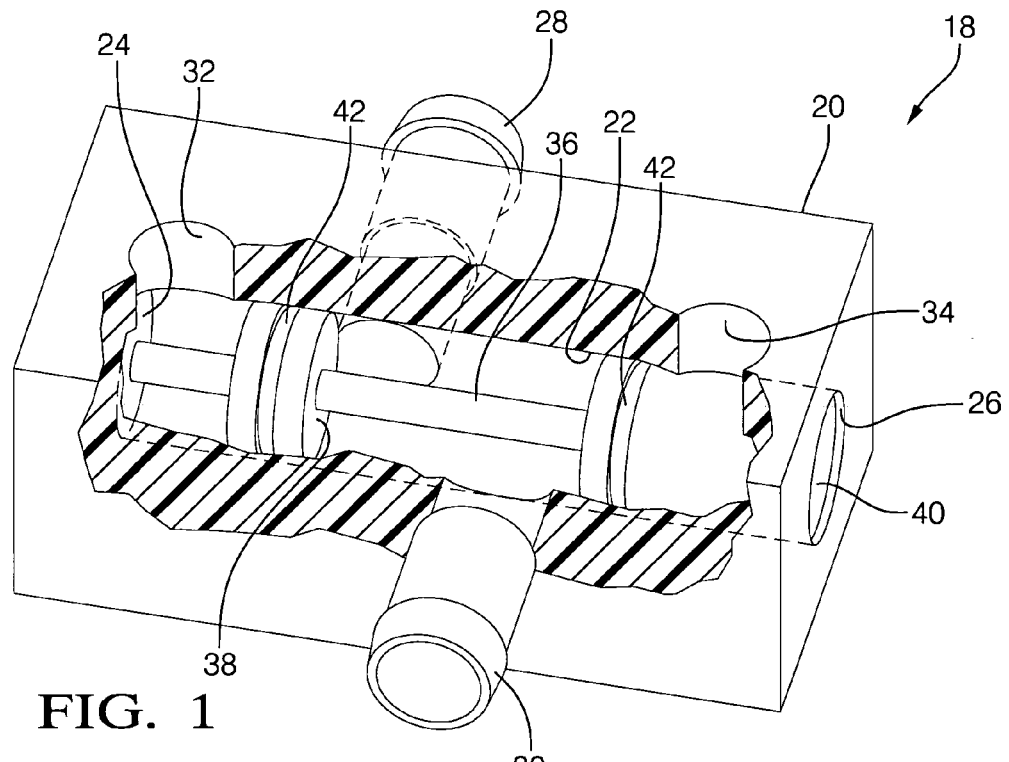
FIG. 1 is a perspective view of the valve, partially broken away, during normal operation.
Figure 5:
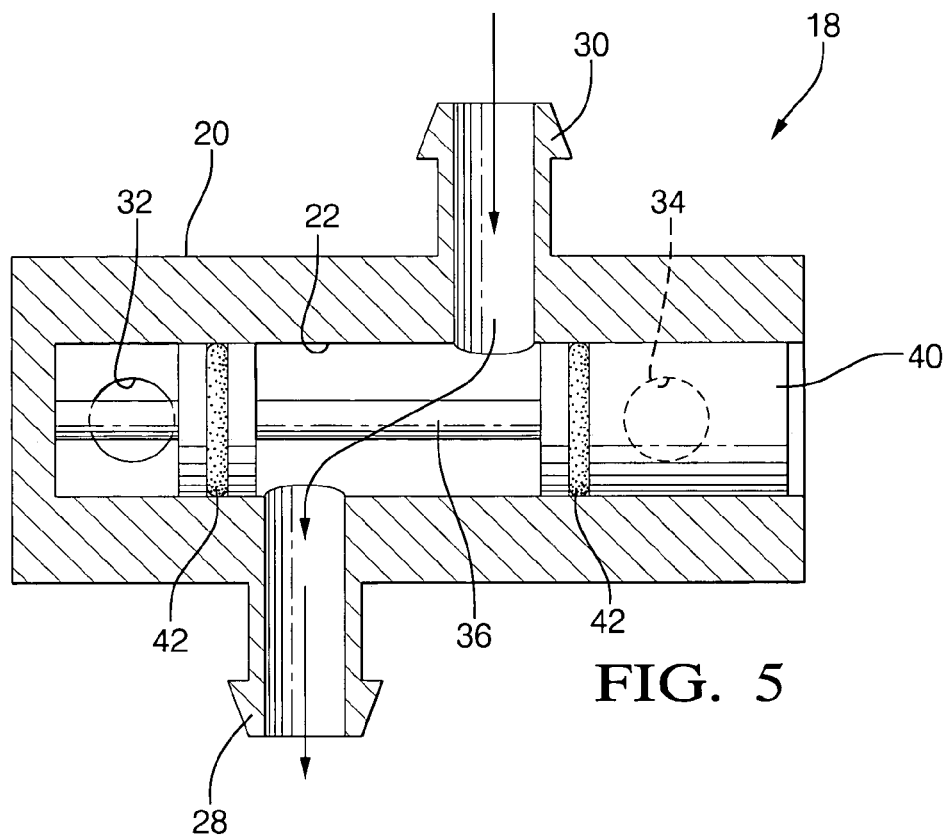
FIG. 5 is a cross section of the valve body, looking up, corresponding to FIG. 1

Referring next to FIGS. 1 and 5, in the normal running position, valve 18 does no more than pass coolant through it. Valve 18 has a main body 20, a molded or machined block, with a central bore 22 having a inner closed end 24 and an outer open end 26. A system outlet port 28 and a circumferentially opposed, discrete system inlet port 30 open through block 20 and into central bore 22, axially offset from one another by a distance described below. Each system port 28 and 30 is also axially spaced from the bore's closed and open ends 24 and 26, so as to leave axial space within bore 22 to accommodate other valve structure. Also opening through block 20 and into central bore 22 are a fill outlet port 32 and a fill inlet port 34, opening, conveniently, through the same face of block 20. Fill outlet port 32 is located near the bore closed end 24, between system outlet port 28 and bore closed end 24, while fill inlet port 34 is located between system inlet port 30 and bore open end 26, near the open end 26. A narrow, coaxial plunger 36 slides within bore 22, and carries a inner disk 38 and an outer disk 40, each of which carries an O ring 42 that fits closely within bore 22, that is, close enough to seal against leakage of the coolant, which is typically not high pressure. In the normal operating position shown, with plunger 36 inserted axially all the way into bore 22, inner disk 38 resides completely in the axial space between the two outlet ports 28 and 32, dividing and sealing them one from another, while the outer disk 40 resides in the axial space between the two inlet ports 30 and 34, also dividing and sealing them from one another. The two system ports 28 and 30 are left totally unblocked and open to one another. It will be noted that the end of plunger 36 engages the bore closed end 24, providing a natural locater for the normal operating position, while outer disk 40 is nearly flush to the bore open end 26. As such, outer disk 40 is accessible by a suitable tool, such as a threaded bit (not illustrated), but not freely accessible to purely manual manipulation. Each fill port 32 and 34 is blocked off from any system coolant flow, by the O rings 42. While the block 20 is sealed against leaks, the two system ports 28 and 30 open freely to one another across central bore 22. Coolant flows, as shown by the arrows, freely through the entire system 10, just as if the two system ports 28 and 30 were joined end to end. In that regard, the terms "inlet" and "outlet" for the system ports 28 and 30 are somewhat arbitrary, they simply represent a break in what would otherwise be a continuous flow line, provided to accommodate valve 18. While valve 18 occupies some space, in general, block 20 is much more compact than a coolant reservoir would be. The normal operating position of valve 18 is the position it would be in for essentially the entire life of the system, but for the initial fill event, described next.

Figure 3:
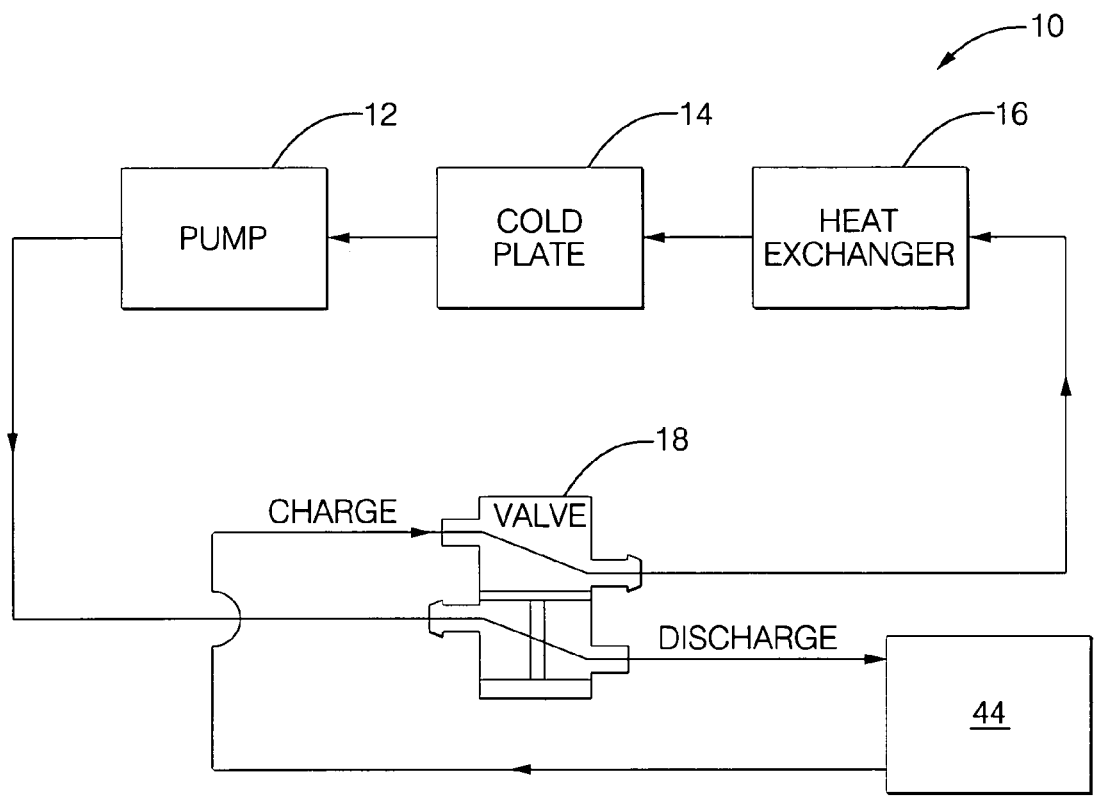
FIG. 3 is a schematic of a liquid cooling system, with a fill and bleed valve according to the invention, during the initial filling operation.

Referring next to FIG. 3, the system 10 is shown during an initial coolant fill operation, after all components have been assembled, but before it is operating. Valve 18 has been axially retracted to a fill position (detailed below) and coolant is being pumped continually, from a supply pool 44, into the fill inlet port 34, continually through the system 10 and all components thereof (pump 12, cold plate 14, heat exchanger 16, and all interconnecting lines) and finally out of fill outlet port 32 and back to the supply pool 44. This would be done long enough that no significant visible air was being purged from the fill outlet port 32. Consequently, the fill operation should not have to be done under any significant pressure, or be assisted by a vacuum pull, nor should a separate air bleed valve be needed anywhere, as is often found on hydronic heating systems and the like. Coolant would simply be pumped through until all entrapped air is swept out, and the liquid fill is solid. The internals of valve 18 that allow this to occur are described next.

Figure 2:
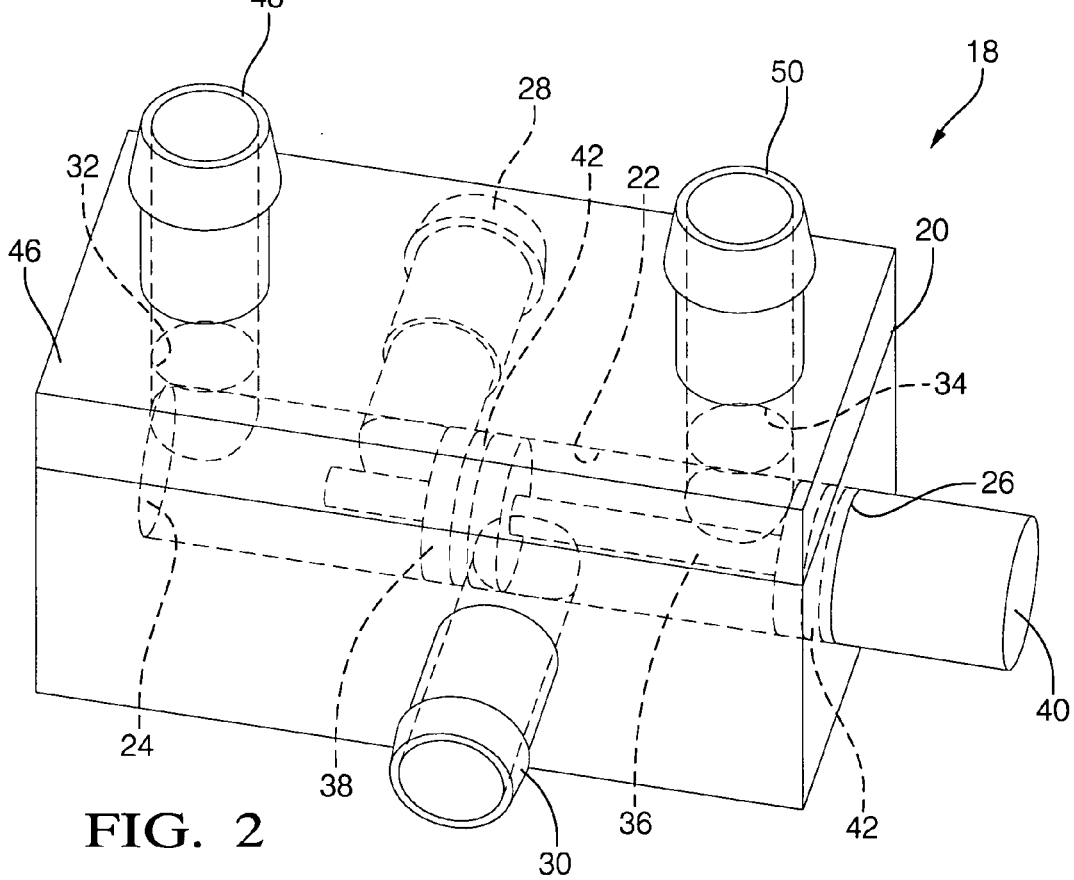
FIG. 2 is a view of the valve like FIG. 1, but during the initial filling operation.
Figure 6:
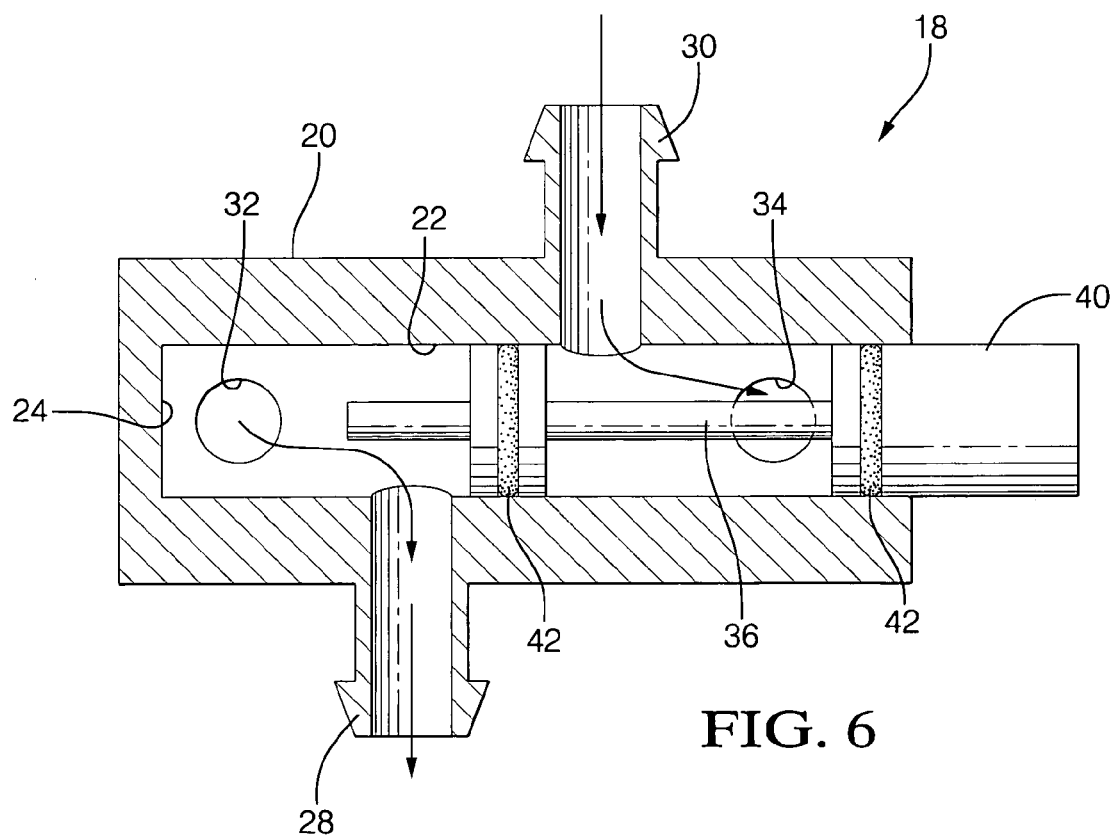
FIG. 6 is a view like FIG. 5, corresponding to FIG. 2.

Referring next to FIGS. 2 and 6, plunger 36 is retracted axially far enough to move inner disk 38 between the two system ports 28 and 30, dividing them from one another. As noted above, outer disk 40 could be made tool accessible for this one time operation, as by a threaded shaft and handle threaded into a blind bore in the end of disk 40, and would be pulled out only so far as to leave its seal ring 42 within the bore 22, still sealing the bore open end 26. The proper extent of plunger 36 retraction could be assured by marking the outer disk 40 or providing some other visual or tactile indicator. Conceivably, block 20 could be of a transparent material, as well. Concurrently with the division of the system ports 28 and 30 from one another, the inner disk 38 and bore closed end 24 together open the system outlet port 28 and fill outlet port 32 to one another. Also concurrently, the plunger disks 38 and 40 together open the system inlet port 30 and fill inlet port 34 to another, while outer disk 40 continues to block the otherwise open end of bore 22. Next, a suitable fill fitting, such as the plate 46 shown would be attached or clamped to the face of block 20. Individual line fittings 48 and 50 register with the fill ports 32 and 34 respectively. The plate 46 is no more than a convenient mechanism to attach the fill system to the valve 18, and could be a permanent part thereof, room permitting, with the fittings 48 and 50 simply acting as extensions of the fill ports 32 and 34. When lines from the coolant supply pool 44 are attached to the fittings 48 and 50, the fill operation described above is carried out. Coolant entering fill inlet port 34 is forced into system inlet port 30, through all the system components, back to system outlet port 28, out of fill outlet port 32 and back to the supply pool 44. Post fill, plunger 36 is inserted back to its original position, bottoming out on the bore closed end 24. The system ports 28 and 30 are reopened to each other. Liquid coolant trapped between the plunger inner disk 38 and the bore closed end 24 is not trapped, but is squeezed out of the fill outlet port 32. Concurrently, coolant trapped between the plunger disks 38 and 40 moves with the plunger 36 in a solid column, with no air intruding, maintaining the air free nature of the system fill. Finally, the plate 46 (if present) is removed. If desired, for a fail safe, the fill ports 32 and 34 could be separately plugged, and the plunger 36 could be locked in place with a suitable tamper proof key or pin.

Variations in the disclosed embodiment could be made. The valve block 20 and central bore 22 could comprise a cylindrical pipe section, in effect, closed at one end, and open at the other, with a plunger 36 sliding within. The central bore 22 and disks 38 and 40 need not absolutely be cylindrical in shape, though that is most convenient. As noted, the fill ports 32 and 34 need not open through the same face of block 20, though that, too, is convenient. Fundamentally, the system ports 28 and 30 must have discrete openings into central bore 22, but need not be absolutely 180 degrees circumferentially opposed to one another. It is convenient that the be substantially circumferentially opposed, however. Likewise, the system ports 28 and 30 need not be axially offset sufficiently to accommodate the entire thickness of inner disk 38 between them, with no axial overlap of inner disk 38 with either port opening. So long as there is sufficient axial offset to allow the inner disk 38 to divide one system port 28 from the other 30, the basic concept will still work. Theoretically, the effective axial offset that allows the fill position division of the two system ports 28 and 30 from one another could be partially, or totally, built into the inner disk 38 itself, by cutting away an opposed 180 degrees off of each face of inner disk 38, rather than by axially offsetting the system ports 28 and 30 from each other. This would require that the inner disk 38 be kept in a preferred angular orientation within the bore 22, however. In either case, unless the system ports 28 and 30 are axially offset from one another sufficiently to accommodate the entire thickness of inner disk 38, then some of the area of the ports 28 and 30 opening into bore 22 will be more likely to be blocked during the fill operation, creating an undesirable, though perhaps not debilitating, flow restriction during the fill operation. On the other hand, having the system ports 28 and 30 axially offset from one another more than is absolutely necessary just to accommodate the thickness of inner disk 38 would not be preferred, since the necessity for normal coolant flow to "jog" axially from one system port to the other across the central bore 22 represents some additional flow restriction. The extra length of plunger 36 extending axially from the inner face of inner disk 38, as noted above, creates a stop to define the normal operating position of valve 18. That locator could be provided as well by the flush positioning of outer disk 40 to the end of block 20, allowing plunger 36 to be shorter than disclosed. The outer disk 40 need not be as thick as shown, needing only enough thickness to accommodate its o ring 42. In that event, a smaller diameter, discrete knob could be created on the end of plunger 36, outboard of a thinner outer disk 40, allowing easier manual manipulation of the valve 18. Post fill, if desired, the fill ports 32 and 34, while sealed internally by the o rings 42, could be additionally sealed externally, as by a non illustrated, clamped in place cover or gasket, as a redundant fail safe.

The invention claimed is:

1. A fill and bleed valve for filling a liquid circulating system, comprising,
    a valve body having an axial central bore with a closed end and an open end,
    a system inlet port and system outlet port opening into said valve body central bore at discrete locations between and axially spaced from said bore closed end and open end,
    a fill inlet port opening into said central bore at a discrete location axially between said bore open end and said system inlet port,
    a fill outlet port opening into said central bore at a discrete location axially between said bore closed end and said system outlet port
    a plunger axially movable within said central bore, accessible from said bore open end, and having a close fitting inner disk located respective to said bore closed end and a close fitting outer disk located respective said disk open end, said inner and outer disks being located relative to one another and relative to said system inlet and outlet ports such that, in an axially inserted, normal operating position, the inner disk seals the system outlet port and fill outlet port from one another and also seals the system inlet port and fill inlet port from one another, while concurrently opening the system inlet and outlet ports to one another, while in an axially retracted, filling position, the inner disk seals the system inlet and outlet ports from one another and concurrently opens the fill outlet port and system outlet port to one another, while the outer disk seals the open end of the bore and concurrently opens the fill inlet port and system inlet port to one another,
    whereby the axial insertion and retraction of the plunger alone and the axially movable inner and outer disks in the single central valve body bore accommodate both the system filling operation and normal system operation.

2. A fill and bleed valve according to claim 1, further characterized in that the central bore is cylindrical in shape.

3. A fill and bleed valve according to claim 1, further characterized in that the system inlet port and system outlet port are axially spaced apart by a distance sufficient to substantially accommodate the entire extent of the plunger's inner disk during the filling operation.

4. A fill and bleed valve according to claim 2, further characterized in that said fill inlet port and fill outlet port open through the same side of the valve block.

5. A fill and bleed valve according to claim 2, further characterized in that the end of said plunger engages the closed end of said central bore to define the normal operating position of the valve.

* * * * *